United States Patent
Shorrock et al.

(10) Patent No.: US 10,550,970 B2
(45) Date of Patent: Feb. 4, 2020

(54) CONNECTOR DEVICE

(71) Applicant: KUTTING UK LIMITED, Bedfordshire (GB)

(72) Inventors: Lee Peter Shorrock, Northamptonshire (GB); Kevin Johnson, Northamptonshire (GB); Peter Shorrock, Northamptonshire (GB)

(73) Assignee: KUTTING UK LIMITED, Bedfordshire (GB)

( * ) Notice: Subject to any disclaimer, the term of this patent is extended or adjusted under 35 U.S.C. 154(b) by 0 days.

(21) Appl. No.: 15/328,930

(22) PCT Filed: Jul. 13, 2015

(86) PCT No.: PCT/GB2015/000209
§ 371 (c)(1),
(2) Date: Jan. 25, 2017

(87) PCT Pub. No.: WO2016/016597
PCT Pub. Date: Feb. 4, 2016

(65) Prior Publication Data
US 2017/0211729 A1    Jul. 27, 2017

(30) Foreign Application Priority Data
Jul. 29, 2014  (GB) .................................. 1413430.8

(51) Int. Cl.
*F16L 19/065*  (2006.01)
*F16L 19/06*   (2006.01)
(Continued)

(52) U.S. Cl.
CPC ............. *F16L 19/065* (2013.01); *F16L 15/04* (2013.01); *F16L 15/08* (2013.01); *F16L 19/063* (2013.01); *Y10T 403/7056* (2015.01)

(58) Field of Classification Search
CPC ....... F16L 15/08; F16L 19/065; F16L 19/063; Y10T 403/7056
(Continued)

(56) References Cited

U.S. PATENT DOCUMENTS 3,232,648 A *   2/1966  Franck .................. F16L 19/063
                                                    285/322
3,362,731 A     1/1968  Gasche et al.
(Continued)

FOREIGN PATENT DOCUMENTS

GB   2 081 407    2/1982
WO   99/32821     7/1999

*Primary Examiner* — Zachary T Dragicevich
(74) *Attorney, Agent, or Firm* — Clark & Brody

(57) ABSTRACT

A connector (10) has a male part (12) connected to a female part (50), and each has a passageway which is coaxial with the other when the parts (12 and 50) are connected. A collet (24) surrounds the male part (12), is coupled thereto, and has an external screwthread which engages an internal screwthread on the female part (50), whereby relative rotation between those screwthreads in a given sense causes the female part (50) to sealingly engage the male part (12). The collet (24) has a slot (40) extending longitudinally with respect to the axis of the screwthreads to enable it to be splayed. A wedge (34) between the male part (12) and the collet (24) is displaceable longitudinally with respect to the axis of the screwthreads to splay the collet (24) and lock the male and female parts (12 and 50) together in a sealing engagement.

12 Claims, 6 Drawing Sheets

(51) Int. Cl.
*F16L 15/04* (2006.01)
*F16L 15/08* (2006.01)

(58) Field of Classification Search
USPC ..... 285/385, 322, 342, 353, 356, 357, 151.1
See application file for complete search history.

(56) References Cited

U.S. PATENT DOCUMENTS

| | | | | |
|---|---|---|---|---|
| 3,733,093 | A * | 5/1973 | Seiler | 285/342 |
| 4,815,360 | A * | 3/1989 | Winterle | |
| 5,197,770 | A * | 3/1993 | Knapp | 285/353 |
| 6,488,318 | B1 * | 12/2002 | Shim | 285/322 |
| 8,840,152 | B2 * | 9/2014 | Carcagno | 285/356 X |

* cited by examiner

CONNECTOR DEVICE

BACKGROUND OF THE INVENTION

The present invention relates to a connector device comprising a male part and a female part which engages the female part when those two parts are connected together, those two parts having respective passageways which are coaxial when they are connected together.

In one such device which has already been proposed, there is a gland nut surrounding the male part and having an externally screwthreaded sleeve portion. A gland screw has a screwthread which engages a corresponding screwthread of the gland nut. A wedge part has a forward portion which extends within the said sleeve portion and a rearward portion which abuts a portion of the gland screw, a forward portion of the wedge part and the said sleeve portion having mutually engaging wedge surfaces. The wedge part is split, so that as the gland screw is tightened relative to the gland nut, the wedge part is squeezed onto such a male part to effect a lock onto such a male part. However, such a previously proposed device lacks a satisfactory locking with such a female part when the device is in use, especially in off-shore applications in environments with very high pressures, and in which the connector device needs to withstand high torsional and lateral forces.

BRIEF SUMMARY OF THE INVENTION

The present invention seeks to provide a remedy.

Accordingly the present invention is directed to a connector device comprising:

a male part;

a collet which surrounds the male part and is coupled thereto, which collet has an external screwthread which engages an internal screwthread on such a female part, when the device is in use, and which collet has at least one slot in it extending longitudinally with respect to the axis of the screwthreads to enable it to be splayed; and a wedge part which is located between the male part and the collet and is displaceable longitudinally with respect to the axis of the screwthreads to splay the collet, characterized in that the collet is coupled to the male part by way of a reverse threaded collar of the device secured to the male part by way of interengaging screwthreads on the collar and the male part, an end of the collet abutting the collar during relative rotation between the screwthreads of the collet and such a female part in a given sense when the device is in use to cause the male part to sealingly engage such a female part, the collar then being adjacent to the sealing engagement and in that the splaying of the collet locks the male part and such a female part in such a sealing engagement with one another when the device is in use.

This provides an effective transmission of an axial force from the collet to the male part. The fact that the collar is secured to the male part by way of interengaging screwthreads on the collar and on the male part effects a strong connection between the collar and the male part. The fact that the interengaging screwthreads on the collar and on the male part are of opposite handedness to the said external screwthread of the collet and the internal screwthread of such a female part ensures that any friction between the collet and the collar does not undo the collar whilst the collet is screwed into such a female part.

The connector device may further comprise such a female part which engages the male part in such sealing engagement, those two parts having respective passageways which are coaxial when those two parts are connected together.

The slot may be open at both ends, so that it is a through slot and the collet is a split collet.

This enables the collet to be splayed more readily.

The said sealing engagement may be between a chamfered rim at an end of the male part, and a chamfered lip within the female part.

This facilitates a good seal.

The angle of the chamfering on the male part, relative to the axis of the screwthreads, may be less than the angle of the chamfering on the female part.

This enables the material at the end of the male part to dig in to the material of the female part, and effect a strong seal.

The angle of the chamfering on the male and female parts may be in the range from 55° to 65°.

This is especially effective in creating a good seal.

The angle of the chamfering on the male part end may be substantially 59° and the angle of the chamfering on the female part may be substantially 60°.

The surfaces of the collet and the collar which abut one another may be on a slant, such that the collar tapers in a direction towards the collet.

This also tends to splay the collet as the latter is screwed into the female part.

This is achieved most readily if the angle of the slant relative to the axis of the screwthreads is in the range from 55° to 65°, preferably 60°.

The device may further comprise a nut which surrounds the male part and which engages the collet to enable the latter to be rotated relative to the female part.

This facilitates the application of a higher torque to the collet.

The nut may engage the collet by means of at least one protuberance on one of those parts, preferably the collet, received in at least one recess in the other of those parts.

Such a construction facilitates torque transference from the nut to the collet.

There may be a number of protuberances spaced apart around the collet, for example three.

This provides for an even distribution of torque.

One of the three protuberances may be opposite the said at least one slot.

As a result, the corresponding recess which receives it does not require much lateral tolerance because the splaying of the collet will be away from an imaginary plane passing through the slot and the protuberance opposite it.

The recesses for the protuberances which are not opposite the slot may be wider than the protuberances to provide a lateral tolerance.

This facilitates the splaying of the collet.

The nut and the collet may also engage one another by way of interengaging flange portions to inhibit relative movement between the nut and the collet away from one another in a longitudinal direction relative to the screwthread axis.

This facilitates the displacement of the wedge part relative to the collet.

The wedge part may be an integral part of a screw which has a screwthreaded engagement with the nut, so that relative rotation between the screw and the nut causes the wedge part to be driven further into the space between the collet and the male part, to splay the collet.

This action may be enhanced by having both the wedge part and the space between the collet and the male part tapering towards the female part.

The angle of slant of the tapering relative to the axis of the screwthreads may be in the range from 7° to 25°, preferably about 10°, but 20° may be effective.

The wedge part may also have at least one slot in it extending longitudinally relative to the axis of the screwthreads.

This provides the advantage that as the screw is tightened, the wedge part is squeezed onto the male part at the same time as the collet is splayed against the internal screwthread of the female part, increasing the locking together of these parts.

The collet may have a plurality of slots, for example eight, spaced apart around the axis of the collet, preferably uniformly spaced apart around the axis of the collet.

Each collet slot may have a blind end which is wider than the rest of the slot, for example it may have a blind end in the form of a laterally extending through-hole having a diameter which is greater than the width of the slot, to act as a stress relieving point and reduce the likelihood of fracture of the material at the blind end of the slot.

The wedge surfaces may extend at an angle of substantially 20° to a longitudinal axis of the device.

The screw and the said wedge part may be made as separate components. Those components may abut one another at respective surfaces which are slanted at substantially 45° to the axis of the said screw.

The nut and the collet may be integral with one another so that they are made as a single component.

BRIEF DESCRIPTION OF THE DRAWINGS

Examples of a connector device embodying the present invention will now be described in greater detail with reference to the accompanying drawings, in which.

DETAILED DESCRIPTION OF THE INVENTION

Figure 1:
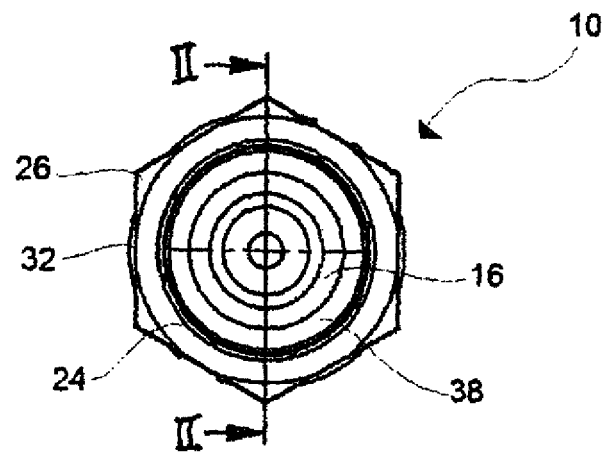
FIG. 1 shows an end view of a first embodiment of parts of a connector device embodying the present invention, without a female part thereof.
Figure 2:
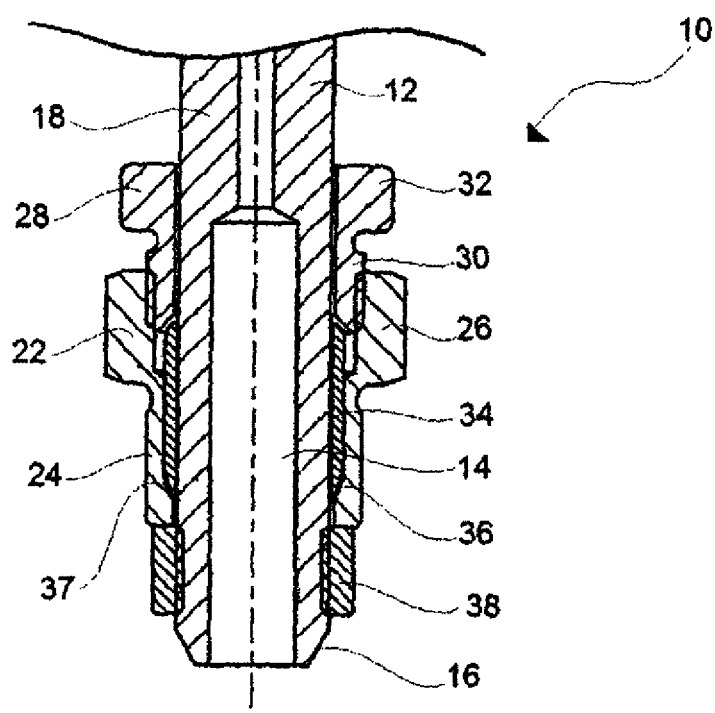
FIG. 2 shows an axial sectional view of the parts shown in FIG. 1, in the plane indicated by the line II-II shown in FIG. 1.
Figure 3:
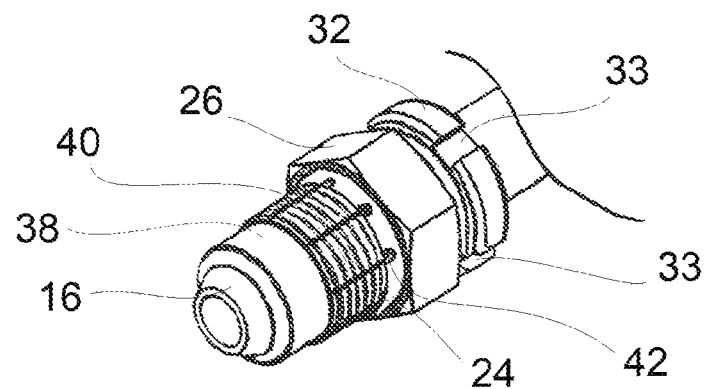
FIG. 3 shows a perspective view from one side and from one end of the parts shown in FIGS. 1 and 2.

The parts of a connector device 10 shown in FIGS. 1 to 3 comprises a stainless steel tubular male part 12 having an axially extending through-bore 14. The forward end of the male part 12 has a chamfered outer rim 16, the slanting surface of which is at substantially 59° to the longitudinal axis of the male part 12.

The through-bore 14 is of reduced cross-sectional diameter at a rear portion 18 of the male part 12.

The male part 12 is surrounded by a nut 22 having an externally screwthreaded sleeve portion 24 constituting a collet at its forward and, and a rearward portion 26 in the form of a hexagonal nut with an internal screwthread of greater cross-sectional diameter than the external cross-sectional diameter of the male part 12.

The connector device 10 further comprises a screw 28 having a forward portion 30 in the form of an externally screwthreaded sleeve which engages the internal screwthread of the rearward hexagonal nut portion 26 of the nut 22. The screw 28 has a rearward portion 32 which is provided on its outside with recesses 33 (shown in FIG. 3) which enable it to be engaged by a C spanner (not shown).

The connector device 10 is further provided with a wedge part 34 with a split forward half and which has forward outer wedge surfaces 36 which are everywhere on a slant relative to the longitudinal axis of the male part 12, and also therefore relative to the axis of the screwthreads of the device 10, at an angle of substantially 20°. The wedge part 34 is generally cylindrical, and is sandwiched between the nut 22 and the male part 12 which it surrounds. The nut 22 is provided with an internal wedge surface 37 which is also on a slant relative to the longitudinal axis of the male part 12 at an angle of substantially 20°, and is in abutment with the wedge surfaces 36 of the wedge part 34.

The rear end of the wedge part 34 is chamfered to provide an outer surface which is everywhere on a slant relative to the longitudinal axis of the male part 12 at an angle of substantially 45° thereto. It abuts a corresponding internal surface of the screw 28 which is also at an angle of 45° to the longitudinal axis of the male part 12.

The connector device 10 shown in FIGS. 1 to 4 is also provided with a reverse threaded collar 38 having an internal left-handed screwthread engaging a left-handed screwthread on the outside of the forward end of the male part 12.

As is more readily seen in FIG. 3, the sleeve portion 24 of the nut 22 is provided with eight axially extending slots 40, each of which is open at a forward end of the sleeve 24 and is blind at his opposite end where it widens by virtue of its opening into a laterally extending through-hole 42 in the sleeve portion 24. Thus each through-hole 42 has a diameter greater than the width of each slot 40. The through-holes 42 act as stress relieving points to reduce the likelihood of the material of the gland nut 22 fracturing at the blind ends of the slots 40.

Figure 4:
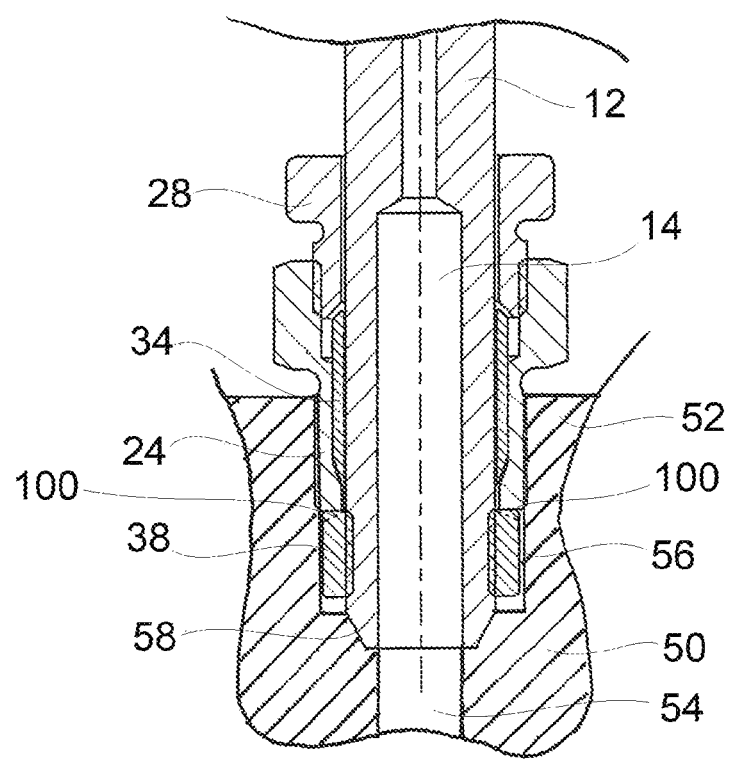
FIG. 4 shows an axial sectional view of the whole of the device parts of which are shown in FIG. 2 with the male part thereof connected to a female part of the device.

FIG. 4 shows the parts of the device shown in FIG. 2 connected to a stainless steel female part 50 (only a portion of which is shown in FIG. 4) to complete the device. The female part 50 is provided with an internal screwthreaded portion 52 which engages the externally screwthreaded sleeve or, collet 24 of the nut 22. The female part 50 is also formed with a bore 54 which communicates with and is in alignment with the axial through-bore 14 of the male part 12.

The female part 50 is provided with a recess 56 to accommodate the collar 38 on the male part 12. The female part 50 also has an internal slanting annular surface 58 which abuts the chamfered end 16 of the male part 12, which surface 58 is everywhere at substantially 60° to the longitudinal axis of the male part 12.

Figure 5:
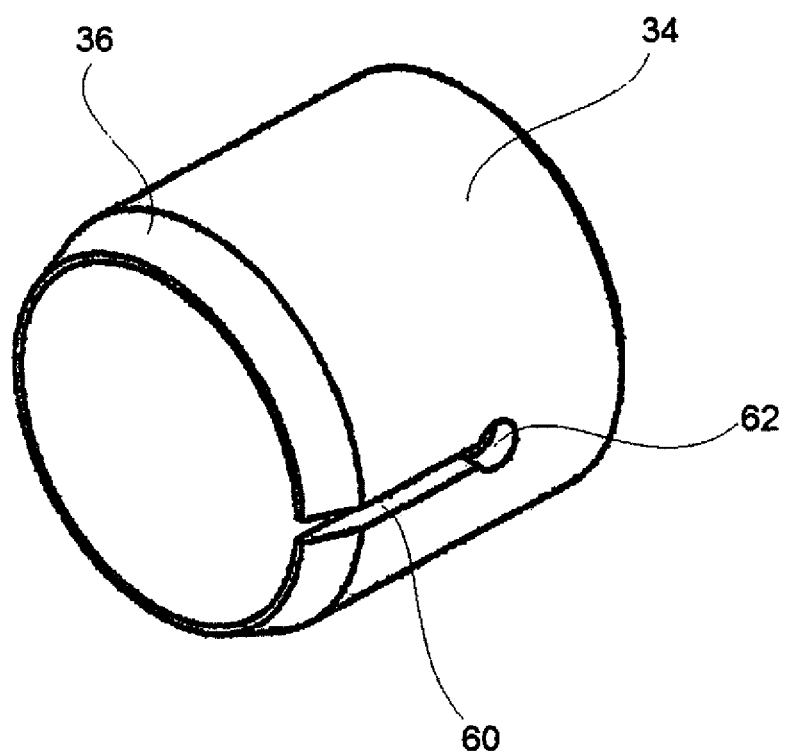
FIG. 5 shows a perspective view from one side and from one end of a part of the device shown in FIGS. 1 to 4.

The wedge part 34 can be seen more clearly in FIG. 5. This shows that the forward half of the wedge part 34 is split by means of a slot 60 which is open at the forward end of the wedge part 34 and which is blind at its opposite end where it widens by virtue of its opening into a laterally extending through-hole 62. Thus the diameter of the through-hole 62 is greater than the width of the slot 60. The through-hole 62 acts as stress relieving point to reduce the likelihood of the material of the wedge part 34 fracturing at the blind end of the slot 60.

All the parts of the connector device shown in FIG. 4 are made of stainless steel, but other materials may be used.

The connector device shown in FIG. 4 is assembled in the following order:

First the wedge part 34 is inserted into the sleeve or collet 24. Next, the nut 22 is screwthreaded onto the screw 28, and the assembly of the nut 22, the screw 28, and the wedge part 34 is slid on to the forward end of the male part 12. The collar 38 is then screwed onto the forward end of the male part 12.

This assembly is now screwed into the female part 50. As the nut 22 with its sleeve 24 which constitutes a collet is tightened within the female part 50, the forward end of the sleeve 24 which constitutes a collet abuts the collar 38 at the same time as the chamfered end 16 of the male part 12 is urged against the correspondingly slanting inner surface 58 of the female part 50. Because the screwthreads of the nut 22 and the female part 50 are right-handed, whereas the screwthreads of the collar 38 and the forward end of the male part 12 are left-handed, the frictional engagement between the nut 22 and the collar 38 tends to rotate the collar 38 towards the nut 22 as the nut 22 is urged towards the collar 38, so that these two parts are jammed tightly against one another. Further tightening of the nut 22 within the female part 50 thereby creates a seal between the male part 12 and the female part 50.

At this stage, the screw 28 is tightened relative to the nut 22, driving the wedge part 34 further into the sleeve portion or collet 24 of the nut 22 so that the wedge surfaces 36 and 37 engage one another and so that at the same time the split forward half of the wedge part 34 is driven against the outer surface of the male part 12, and the portions of the sleeve or collet 24 between the slots 40 are splayed outwardly against the female part 50, so that all the parts are locked together against torsional and lateral forces.

Those parts of the embodiment shown in FIGS. 6 to 9 which are equivalent to the parts described with reference to the embodiment shown in FIGS. 1 to 5 have been labelled with the same reference numerals, even though the parts which correspond may have different dimensions.

The main differences between the two illustrated embodiments are firstly that the screw 28 and the wedge part 34 which are separate components in the embodiment shown in FIGS. 1 to 5 are constituted by one single component in the embodiment shown in FIGS. 6 to 9, so that the screw 28 in the latter embodiment has an integrally formed slender wedge part 34 having a much more acutely angled slanting surface 36, being everywhere substantially 10° relative to the longitudinal axis of the male part 12, and therefore also relative to the screwthreads of the device, the slanting surface extending substantially along the whole length of the wedge part 24.

Secondly, what is shown in the FIGS. 1 to 5 embodiment as a single component, namely the nut 22 with the sleeve part or collet 24, is in the embodiment shown in FIGS. 6 to 9 constituted by two separate components, namely the nut 22 and the collet 24. The end of the nut 22 which is closer to the female part 50 is formed with inwardly directed flange portions 70, and the end of the collet 24 which is further from the female part 50 has outwardly directed flange portions 72. The flange portions 70 and 72 interengage to inhibit relative movement of the nut 22 and the collet 24 away from one another in an axial direction.

Figure 8:
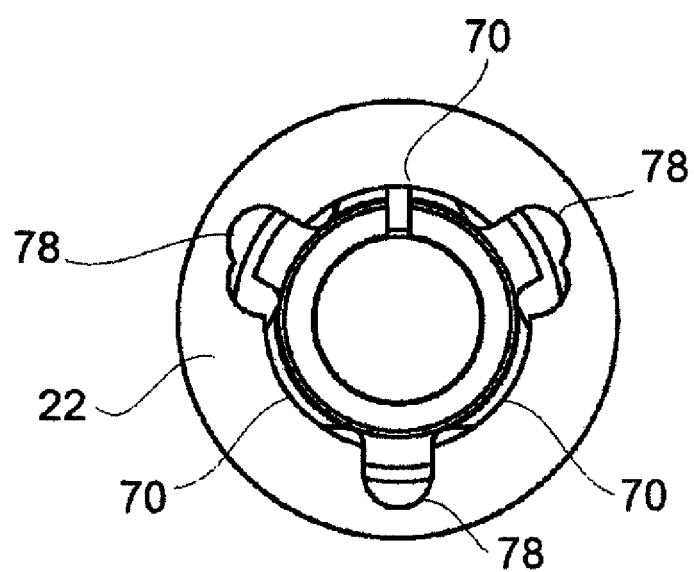
FIG. 8 shows an end view of a part of what is shown in FIG. 6.

At the same time the nut 22 and the collet 24 are coupled together to inhibit relative rotation therebetween about the axis of the device 10 by means of three protuberances or dogs 76 on the outside of the collet 24 adjacent to the flange portions 72 and spaced apart equiangularly around the axis of the collet 24, engaging corresponding recesses 78 formed on the inside of the nut 22 adjacent to the flange portions 70, as shown in FIG. 8. As shown more clearly in FIGS. 9a, 9b, and 9c, the collet 24 in the FIGS. 6 to 9 embodiment is formed with a single slot 80 that extends along the whole length of the collet 24, so that it is a through-slot, enabling the collet 24 to splay along the whole of its length.

One of the dogs 76 is located diametrically opposite the slot 80. The recess in the nut 22 which receives this dog forms a close fit with it. The other two recesses have a degree of widening in the direction towards the close fit recess to facilitate a splaying of the collet 24.

The internal surface of the collet 24 along the greater part of its length is flared in an axial direction towards the rearward portion 32 of the screw 28, and this flared internal surface 37 is also on a slant of substantially 10° relative to the longitudinal axis of the male part 12, and is engaged by the slanting surface 36 of the wedge part 34.

The order and manner of assembly of the connector device shown in FIGS. 6 to 9 is substantially the same as that for the embodiment shown in FIGS. 1 to 5. It will be appreciated that the wedge part 24 in the FIGS. 6 to 9 embodiment is inserted into the collet 24 as the nut 22 is screwed onto the screw 28. Also, the collet 24 splays along the whole of its length as the wedge part 34 is driven further into the collet 24, and this splaying is facilitated by the widening of the two recesses 78 closer to the slot 80.

Numerous variations and modifications to the illustrated connector devices may occur to the reader without taking the resulting construction outside the scope of the present invention. For example, there may be fewer slots 40 or more slots 40 in the FIGS. 1 to 5 embodiment. The wedge part 34 in that embodiment may extend beyond the rear end of the nut 22, and the screw 28 may have an internally screwthreaded portion which engages an externally screwthreaded portion of the nut 22, whilst at the same time having an internal part which abuts the rear end of the wedge part 34. The through-bore 14 through the male part 12 may be of uniform cross-section throughout, so that it has no reduced cross-section in the portion 18, or it may have a widened cross-section instead of a reduced cross-section. The slot 60 may be a through-slot all the way from the forward end to the rearward end of the collet 34, opening at both of these ends. There may be more than one slot 60 with a hole 62 equi-angularly spaced around the wedge part 34.

Figure 6:
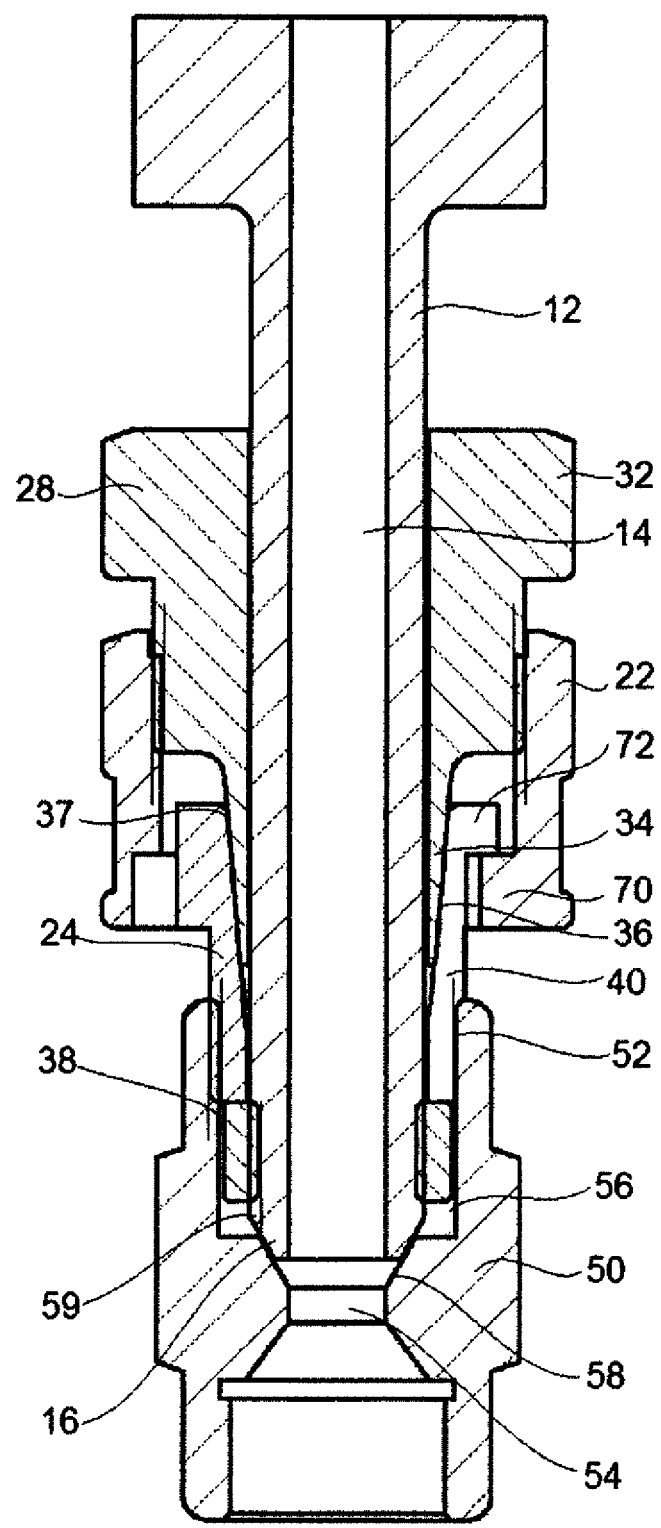
FIG. 6 shows an axial sectional view of a second embodiment of a connector device embodying the present invention.
Figure 7:
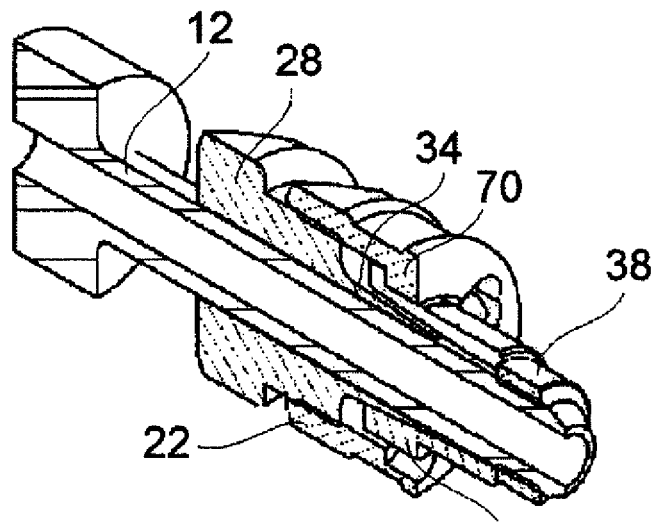
FIG. 7 shows a part axial sectional part isometric view of parts of the device shown in FIG. 6.

The female part 50 shown in FIG. 6 is shown as a tubular portion, but it may instead be part of a wall.

The surfaces of the collet 24 and the collar 38 which abut one another may be slanted relative to the axis of the device, for example at an angle of 60° thereto as shown by the dotted lines 100 in FIG. 4.

Figure 9A:
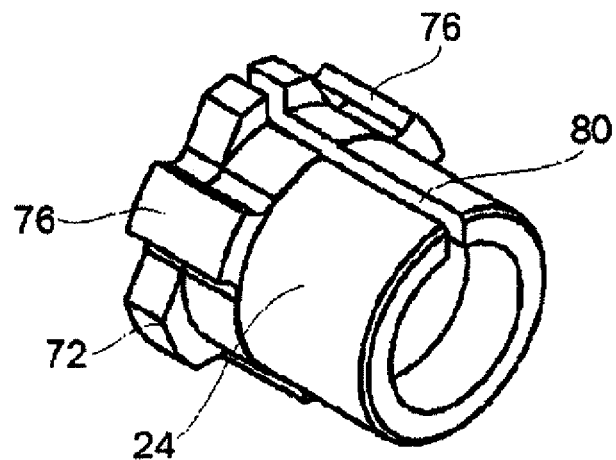
FIGS. 9a, 9b and 9c show respective views of a collet of the device shown in FIGS. 6 to 8, being a perspective view from one end, an end view, and a perspective view from the other end of the collet, respectively.
Figure 9B:
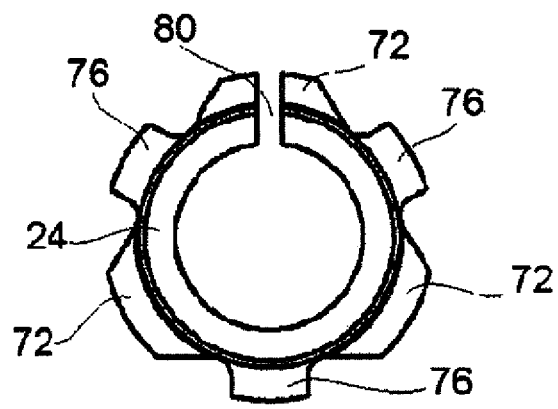
Figure 9C:
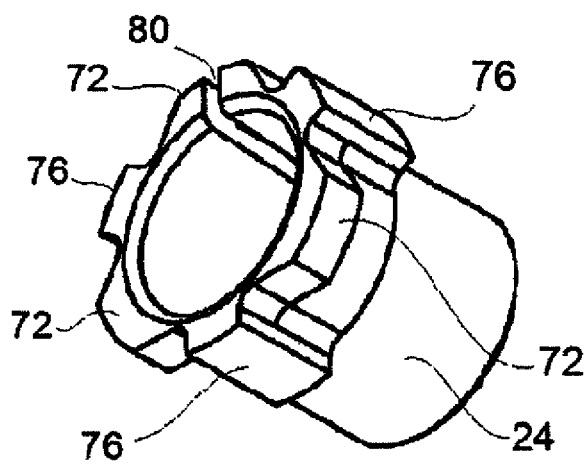

The two dogs 76 of the collet 24 shown in FIGS. 9a, 9b and 9c which are closer to the slot 80 may be arranged symmetrically thereabout at an angle relative to one another, measured from the axis of the collet 24, which is less than 120°, for example they may be at an angle of 100°.

Each of the connector devices illustrated in the Figures may be used to connect hose to a deep sea oil head, for example.

The invention claimed is:

1. A connector device for connection to a female part when the device is in use, the device comprising:
   a male part;
   a collet which surrounds the male part and is coupled thereto, which collet has an external screwthread which engages an internal screwthread on such a female part when the device is in use, and which collet has at least one slot in it extending longitudinally with respect to the axis of the screwthreads to enable it to be splayed; and
   a wedge part which is located between the male part and the collet and is displaceable longitudinally with respect to the axis of the screwthreads to splay the collet,
   wherein the collet is coupled to the male part by way of a reverse threaded collar of the device secured to the male part by way of interengaging screwthreads on the collar and the male part, an end of the collet abutting the collar during relative rotation between the screwthreads of the collet and such a female part in a given sense when the device is in use to cause the male part to sealingly engage such a female part, the collar then being adjacent to the sealing engagement, and wherein the splaying of the collet locks the male part and such a female part in such a sealing engagement with one another when the device is in use.

2. A connector device according to claim 1, in which the slot is open at both ends, so that it is a through slot and the collet is a split collet.

3. A connector device according to claim 1, in which the surfaces of the collet and the collar which abut one another are on a slant, such that the collar tapers in a direction towards the collet.

4. A connector device according to claim 3, in which the angle of the slant relative to the axis of the screwthreads is in the range from 55° to 65°.

5. A connector device according to claim 1, in which the collet is integral with a nut which surrounds the male part, to enable the collet to be rotated relative to the female part.

6. A connector device according to claim 1, in which both the wedge part and the space between the collet and the male part taper towards such a female part.

7. A connector device according to claim 1, in which the wedge part also has at least one slot in it extending longitudinally relative to the axis of the screwthreads.

8. A combination of a connector device according to claim 1, and such a female part which engages the male part in such sealing engagement, those two parts having respective passageways which are coaxial when those two parts are connected together.

9. A combination according to claim 8, in which the said sealing engagement is between a chamfered rim at an end of the male part, and a chamfered lip within the female part.

10. A combination according to claim 9, in which the angle of the chamfering on the male part, relative to the axis of the screwthreads, is less than the angle of the chamfering on the female part.

11. A combination according to claim 9, in which the angle of the chamfering on the male and female parts is in the range from 55° to 65°.

12. A combination according to claim 11, in which the angle of the chamfering on the male and part is substantially 59° and the angle of the chamfering on the female part is substantially 60°.

* * * * *